(12) United States Patent
Schwartz et al.

(10) Patent No.: US 11,208,097 B2
(45) Date of Patent: Dec. 28, 2021

(54) GEOFENCE BODY HEIGHT LIMIT WITH HOIST PREVENTION

(71) Applicant: Caterpillar Inc., Deerfield, IL (US)

(72) Inventors: Timothy D. Schwartz, East Peoria, IL (US); Andrew C. Jensen, Dunlap, IL (US); Rodney L. Menold, Hanna City, IL (US); Anthony J. Weltzer, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 318 days.

(21) Appl. No.: 16/404,556

(22) Filed: May 6, 2019

(65) Prior Publication Data

US 2020/0353916 A1    Nov. 12, 2020

(51) Int. Cl.
*B60W 30/09*    (2012.01)
*B60Q 9/00*    (2006.01)
*B60P 1/04*    (2006.01)

(52) U.S. Cl.
CPC .............. *B60W 30/09* (2013.01); *B60Q 9/008* (2013.01); *B60P 1/04* (2013.01); *B60W 2300/17* (2013.01); *B60W 2710/30* (2013.01); *B60Y 2200/412* (2013.01); *B60Y 2200/415* (2013.01)

(58) Field of Classification Search
CPC ......... B60W 2300/17; B60W 2710/30; B60W 30/09; B60Q 9/008; B60P 1/04; B60Y 2200/412; B60Y 2200/415; E02F 9/2033; E02F 9/262; E02F 9/265
See application file for complete search history.

(56) References Cited

U.S. PATENT DOCUMENTS

| | | | |
|---|---|---|---|
| 6,539,294 B1 * | 3/2003 | Kageyama | E02F 3/842 180/168 |
| 7,656,271 B2 * | 2/2010 | Ehrman | H04L 67/04 340/5.8 |
| 8,618,949 B2 | 12/2013 | Maynard et al. | |
| 8,948,975 B2 | 2/2015 | Peterson et al. | |
| 2003/0024132 A1 * | 2/2003 | Kokura | B66F 17/003 33/712 |
| 2004/0122580 A1 * | 6/2004 | Sorrells | G07C 5/008 701/80 |
| 2008/0162034 A1 | 7/2008 | Breen | |
| 2012/0143446 A1 | 6/2012 | Tushaus | |
| 2014/0014770 A1 | 1/2014 | Teller et al. | |
| 2014/0172246 A1 * | 6/2014 | Farmer | E02F 3/437 701/50 |

(Continued)

FOREIGN PATENT DOCUMENTS

| | | |
|---|---|---|
| CN | 202649469 U | 1/2013 |
| CN | 108345016 A | 7/2018 |

*Primary Examiner* — Tyler J Lee
(74) *Attorney, Agent, or Firm* — Schwegman, Lundberg & Woessner

(57) ABSTRACT

Methods include electronically monitoring sensor or transceiver location information to detect a location of a machine. Responsive to detection of the machine, determining if the machine is located within a first geographic region, and if the machine is located within a first geographic region, electronically sending a command to an actuator that is coupled to the machine to initiate a first response. The first response includes limiting a height of an implement that is coupled to a chassis of the machine. The implement being height-adjustable relative to the chassis by action of the actuator.

19 Claims, 5 Drawing Sheets

(56) References Cited

U.S. PATENT DOCUMENTS

| | | | |
|---|---|---|---|
| 2016/0138248 A1* | 5/2016 | Conway | E02F 9/264 |
| | | | 701/32.3 |
| 2016/0138249 A1* | 5/2016 | Conway | E02F 9/261 |
| | | | 701/50 |
| 2017/0072764 A1 | 3/2017 | Bruce | |
| 2017/0322550 A1 | 11/2017 | Yokoyama | |
| 2018/0068567 A1 | 3/2018 | Gong et al. | |
| 2019/0101649 A1* | 4/2019 | Jensen | G05D 1/0278 |

* cited by examiner

GEOFENCE BODY HEIGHT LIMIT WITH HOIST PREVENTION

TECHNICAL FIELD

The present disclosure is directed generally, but not by way of limitation, to limiting the height of a machine based on a defined geofence. More particularly, this disclosure is directed generally to limiting a machine height based on a height limit that is associated with a specific geographic region.

BACKGROUND

Earth moving, construction and mining machines and the like are sometimes used in worksites having overhead equipment and other overhead obstacles. Such obstacles can include, for example, an overhead conveyor system, power lines or a door that a machine passes through. Examples of the machines that can be used in a worksite include an implement (e.g., a portion that is lifted, articulated or hoisted) relative to a chassis (e.g., body) of the machine to perform functions. Examples of machines having implements that can collide with overhead obstacles include, but are not limited to, articulated trucks having a bed, a loader having a loader bucket, and an excavator having a boom.

As the machine travels around a worksite, if the implement of the machine is raised higher than an overhead obstacle while the machine is under or about to pass under the obstacle, the implement can collide with the overhead obstacle and potentially damage the implement or the obstacle.

There is a need for improvements in preventing collisions with overhead obstacles in a worksite, and in particular, the ability to automatically assist a user in preventing collisions without unduly limiting functions of the machine.

One attempt to address the issue of controlling mobile assets is described in U.S. Patent Publication No. 2008/0162034A1 to Breen and issued on Jul. 3, 2008. The '034 publication describes a system and method for automatically generating a set of geofences, and if the location of a mobile asset is within a prohibited route geo-fence, known to have a low-height, weight-limited bridge or excessively windy route, to transmit an alert to re-route the asset. While the '034 publication provides re-routing, the '034 publication fails to improve the performance of height-changeable machines passing under overhead obstacles, or to keep a height-changeable machine on the most efficient path.

The present disclosure is directed to overcoming one or more of the shortcomings set forth above and/or other shortcomings in the art.

SUMMARY

In one aspect, the present disclosure relates to a method including electronically monitoring, using a processor, sensor or transceiver location information to detect a location of a machine. Responsive to detection, with the processor, that the machine is located within a first geographic region, electronically sending a command, using the processor, to an actuator coupled to the machine to initiate a first response. The first response can include limiting, using the processor, a height of an implement coupled to a chassis of the machine. The implement being configured to be height-adjustable relative to the chassis by the actuator.

In another aspect, the present disclosure relates to a control system for a machine. The system includes an actuator configured to adjust a height of an implement of the machine. The machine also includes a processor configured to send signals to the actuator. The processor can execute instructions to: receive location information regarding a location of the machine and determine from the location information if the machine is within a first geographic region. Responsive to a determination that the machine is within the first geographic region, the processor can send a command to the actuator to initiate a first response. The first response includes limiting the height of the implement of the machine.

In yet another aspect, the present disclosure relates to a machine including a chassis, an implement coupled to the chassis, and an actuator coupled to the chassis and the implement. The actuator is configured to adjust a height of the implement relative to the chassis. A sensor can be configured to provide machine location information, and a processor can be configured to receive the machine location information, to determine if the machine is in a first geographic region, and to send a command to the actuator to initiate a first response if the machine is within the first geographic region. The first response can include limiting the height of the implement.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

FIG. 3 also shows a travel path of the machine between the multiple geographic regions, in accordance with at least one example.

DETAILED DESCRIPTION

Figure 1:
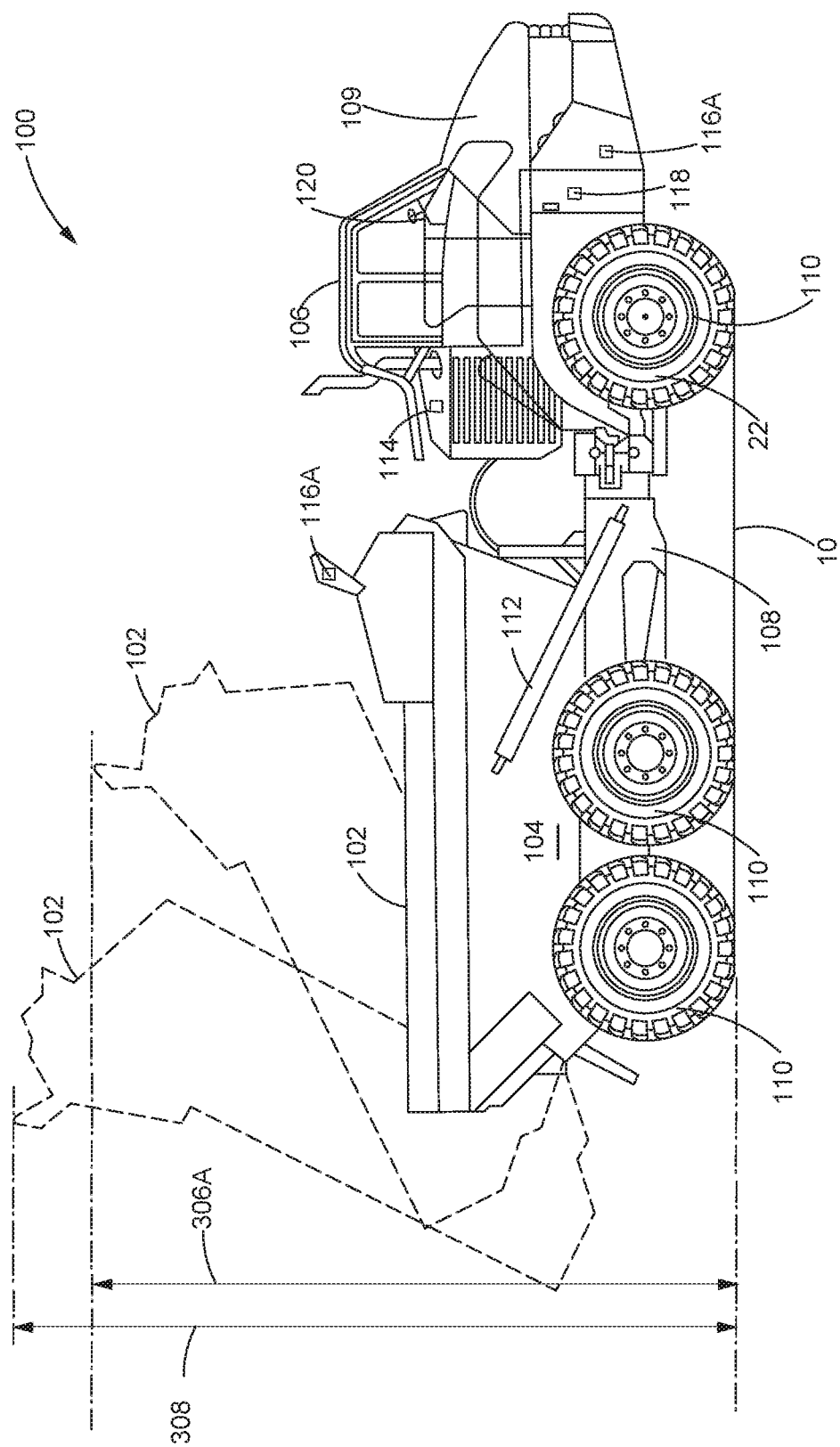
FIG. 1 is a side view of a machine including an implement shown in different positions, in accordance with at least one example.

Various examples of controlling a height of a machine according to height limitations associated with geographic regions of a geofence are described herein. Examples described in this disclosure prevent damage to machines and overhead obstacles. In addition to preventing damage, the examples described herein can do so without unduly limiting the machine function or causing less efficient travel paths. In some examples the geofence can limit the height of the machine in areas of a worksite where there is a roll over potential if the center of gravity of the machine is too high.

Reference will now be made in detail to embodiments of the disclosure, examples of which are illustrated in the accompanying drawings. The same reference numerals generally refer to the same or like components throughout the drawings. Relative terms, such as, "substantially" or "about" are used to indicate a possible variation, for example, of ±10% in a stated numeric value. As defined herein, the use of the terms "or" or "and" includes "or", "and" or "and/or".

Figure 2:
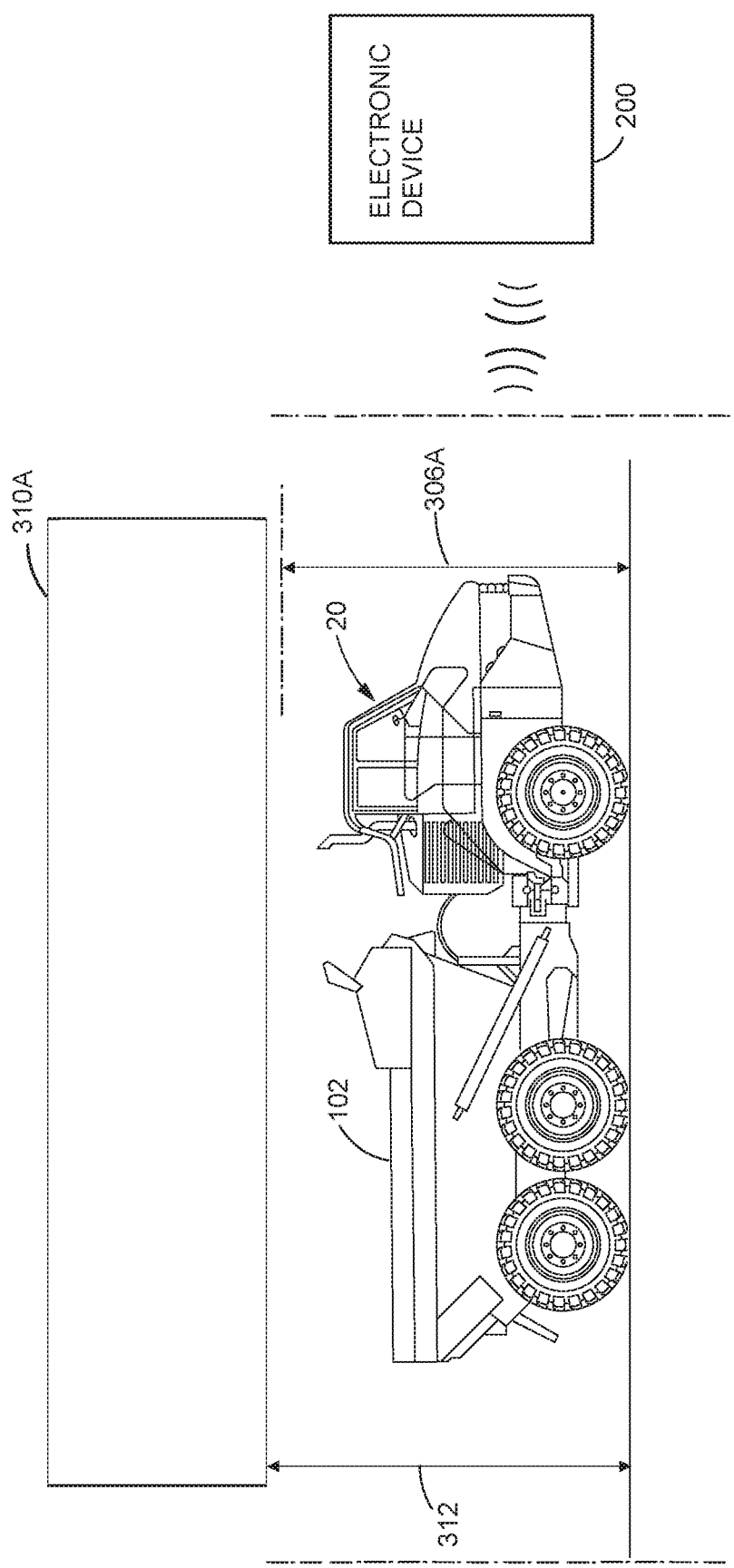
FIG. 2. is a side view of the machine of FIG. 1 passing under an overhead obstacle, and an electronic device for inputting geofence data, in accordance with at least one example.

Together, FIGS. 1 and 2 illustrates an example of a machine 100 having an implement 102 that can be used with the systems and methods described herein. In the example, the machine 100 is shown as an articulating truck having a bed 104. Articulating trucks are often commonly referred to as dump trucks. While the machine 100 is depicted as an articulating truck, aspects of the disclosure can be applied to other machines, including but not limited to, a loader having a loader bucket, or an excavator having an excavator boom. The methods and systems described herein can be used with any machine having an implement that is movable to exceed the base height of the machine.

The machine 100 of FIG. 1 can include a body 106 having a chassis 108 and the implement 102 coupled to the chassis 108. The machine 100 can be powered by a power source 109 that transmits power to any of wheels 110, tracks, or other means to move the machine 100. An actuator 112 coupled to the chassis 108 and to the implement 102 is configured to adjust a height of the implement 102 relative to the chassis 108.

To control aspects of the machine 100, the machine 100 can include a location sensor(s) 114, a height sensor(s) 116A, 116B and a processor 118 (e.g., processor can include control module(s) and/or processor(s)). The location sensor 114 can be configured to provide machine location information to the processor 118. The height sensor 116A, 116B can be configured to provide machine height information to the processor 118. The processor 118, receiving the location information from the location sensor 114, can determine if the machine 100 is in a first geographic region (304A, FIG. 3). The processor 118 can also determine if a height of the machine 100 has exceeded a first height limit 306A (FIGS. 1 and 2), and send a command to the actuator 112 to initiate a first response, if necessary.

The first response can include limiting the height of the implement 102 (and thus, the overall machine 100 height). The height of the implement 102 can be controlled with respect to the chassis 108, with respect to another point on the body 106, or with respect to the ground 10 that the machine 100 is resting on. In some examples, initiating the response can include one or more of limiting the height of the implement 102 and alerting a user to a potential issue. Limiting the height can include not only limiting the height to a first height 306A that is less than a maximum height 308 of the machine, but if necessary, reducing the height of the implement 102 to the first height 306A. In some examples, reducing the height of the implement 102 can include reducing the height of the implement 102 to any suitable height corresponding to a height that prevents damage to the machine 100 when the machine 100 is in a particular location and/or undergoing any of a particular motion, direction or speed. Alerting the user can include, for example, alerting the user via a user interface 120, and/or providing an audible or tactile alert or alarm.

Figure 3:
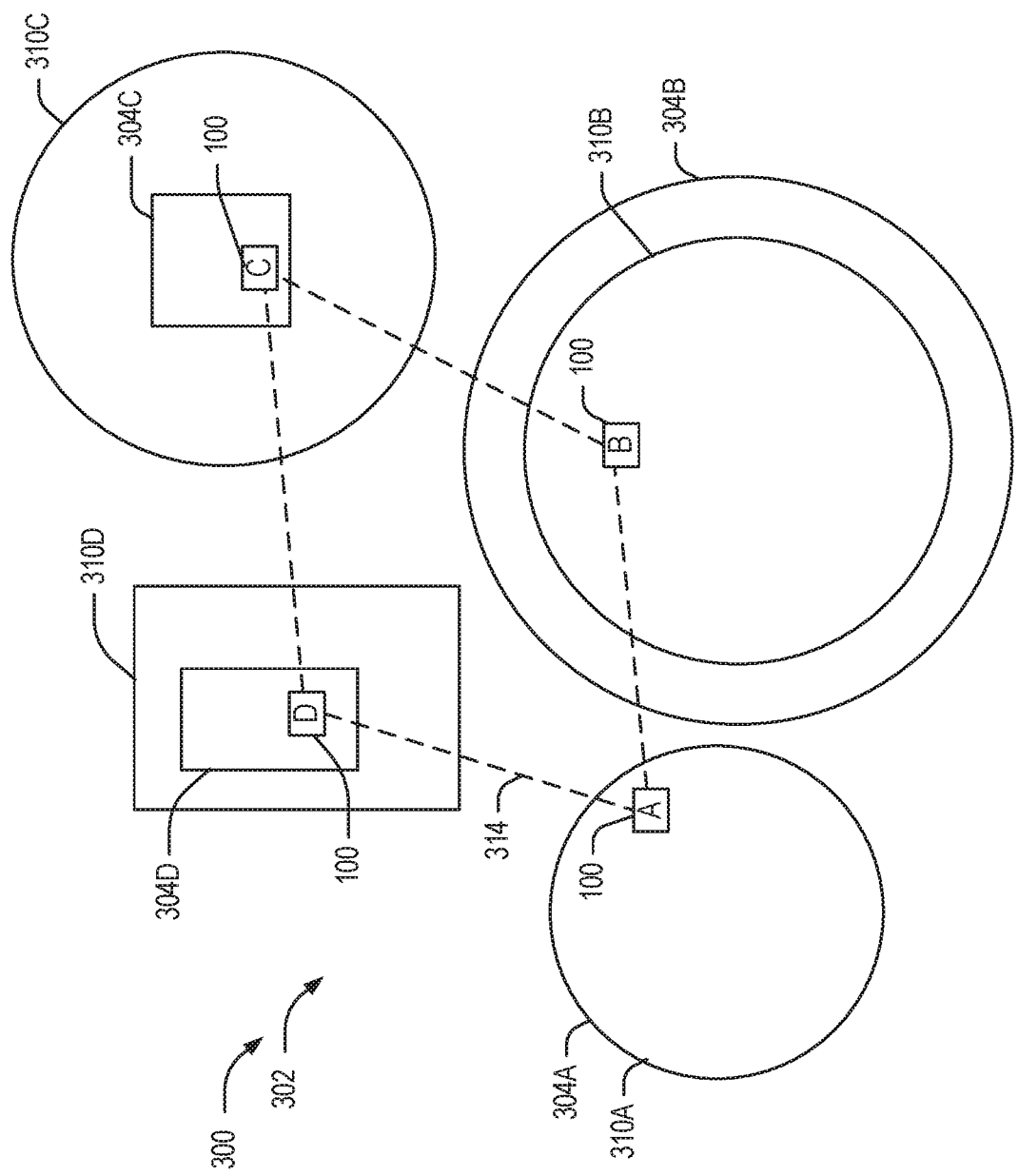
FIG. 3 is a schematic illustration of a geofence area of a worksite, the geofence including multiple geographic regions.

As shown in FIG. 2, which depicts the machine 100 passing under a first overhead obstacle 310A in a work site, limiting the height of the implement 102, and thus the overall height of the machine 100, can include limiting the height of the implement 102 to a first height 306A that is associated with the first geographic region 304A (FIG. 3). The first height 306A can include a maximum height that is allowed in the first geographic region 304A such that the machine 100 can pass under a known first overhead obstacle 310A (FIGS. 2, 3) within the first geographic region 304A (FIG. 3). In some examples, the first height 306A allowed in the first geographic region 304A can be equal to, or more likely, less than, the minimum height 312 of a first overhead obstacle 310A located in the first geographic region 304A.

FIG. 3 is a schematic illustration of an example geofence 300 of a worksite 302. The geofence 300 can include one or more specified geographic regions 304A, 304B, 304C, 304D. In some examples, the geofence 300 can include the one or more geographic regions 304A, 304B, 304C, 304D having a rule or set of rules associated with each of the one or more geographic regions 304A, 304B, 304C, 304D. As shown in the example of FIG. 3, the geofence 300 can include the one or more specified geographic regions such as a first geographic region 304A, a second geographic region 304B, a third geographic region 304C and a fourth geographic region 304D. The geographic regions 304A, 304B, 304C, 304D can also be referred to as geographic boundaries.

Together, the geographic regions 304A, 304B, 304C, 304D shown in FIG. 3 can define the geofence 300. The geofence 300 can include geofence data that is defined (e.g., input, entered) by a user into an electronic device 200 (FIG. 2). The electronic device 200 described herein is described as a remote device, such as a tablet, that wirelessly transmits the geofence data to the machine. However, in some examples the electronic device 200 may be computer such as a desktop or laptop wired or wirelessly couplable to the machine 100. The electronic device 200 can also be physically coupled to the machine 100, such as by a cable and connectors. Using the electronic device 200, the user can input the geofence data including information about the location and characteristics of the geofence 300 for transmission to the machine 100.

FIG. 3 depicts not only a geofence 300 area of a worksite 302, FIG. 3 also depicts an example path 314 (A, B, C, D) of the machine 100 traveling between the multiple geographic regions 304A, 304B, 304C, 304D. In the first geographic region 304A, the area dimensions of the geographic region 304A (FIG. 2) can be the same or substantially the same as the area dimensions of the first overhead obstacle 310 (FIG. 2). As the machine 100 travels from position A to position B, the machine 100 enters the second geographic region 304B where the size of the second geographic region 304B is slightly larger than the second overhead obstacle 310B. An advantage of the second geographic region 304B being larger than the second overhead obstacle 310B is that it allows the machine more time to adjust a height of the machine 100.

As the machine 100 continues to travel on from position B to position C, the third geographic region 304C can be of a different shape than the third overhead obstacle 310C. In addition, the third geographic region 304C is shown as significantly larger than the third overhead obstacle 310C (compared to the second geographic region 304B and the second overhead obstacle 310B). Some of the benefits of making the third geographic region 304C much larger than the third overhead obstacle 310C may include that the third height limit may be very low, and thus the machine 100 may need more time to lower the implement 102 a larger amount, or because a potential collision with the third overhead obstacle 310C would cause more severe damage to the machine 100 or to the third overhead obstacle 310C.

While the first, second and third geographic areas 304A, 304B, 304C are shown as circles, the various geographic regions 304A, 304B, 304C, 304D and overhead obstacles 310A, 310B, 310C, 310D can be any size or shape. The geographic regions 304A, 304B, 304C, 304D do not need to be centered around the overhead obstacles 310A, 310B, 310C, 310D. As shown in FIG. 3, the machine 100, traveling into position D, moves into a rectangular-shaped fourth geographic region 304D and where the fourth overhead obstacle 310D is not centered within the fourth geographic region 304D. This may occur, for example, if the overhead obstacle 310D is located against a fence, wall or in a corner of a building.

In some examples, the rules for the geofence 300 (e.g., geofence data or algorithm) can be specific to a particular type of machine 100 or to a particular machine 100. The reason this may be advantageous is because different machines 100 may need different amounts of time to adjust the height of the implement 102 to prevent a collision with an overhead obstacle. Given the dimensions of a particular overhead obstacle and a height-adjusting factor for a particular machine, the size of a particular geographic region can be determined by a user or automatically by the electronic device 200 (FIG. 2) or by the machine 100. In addition to adjusting the height of the machine 100 based on the geofence 300, in some examples, the travel speed of the machine 100 can be limited. For example, the machine 100 may be controlled to stop or slow down until the machine 100 height is adjusted.

In some examples, one or more of the geographic regions 304A, 304B, 304C, 304D may overlap. In such an example, the height limit (e.g., 306A, FIG. 2) may default to the lowest height limit permitted in the one or more geographic regions 304A, 304B, 304C, 304D.

Figure 4:
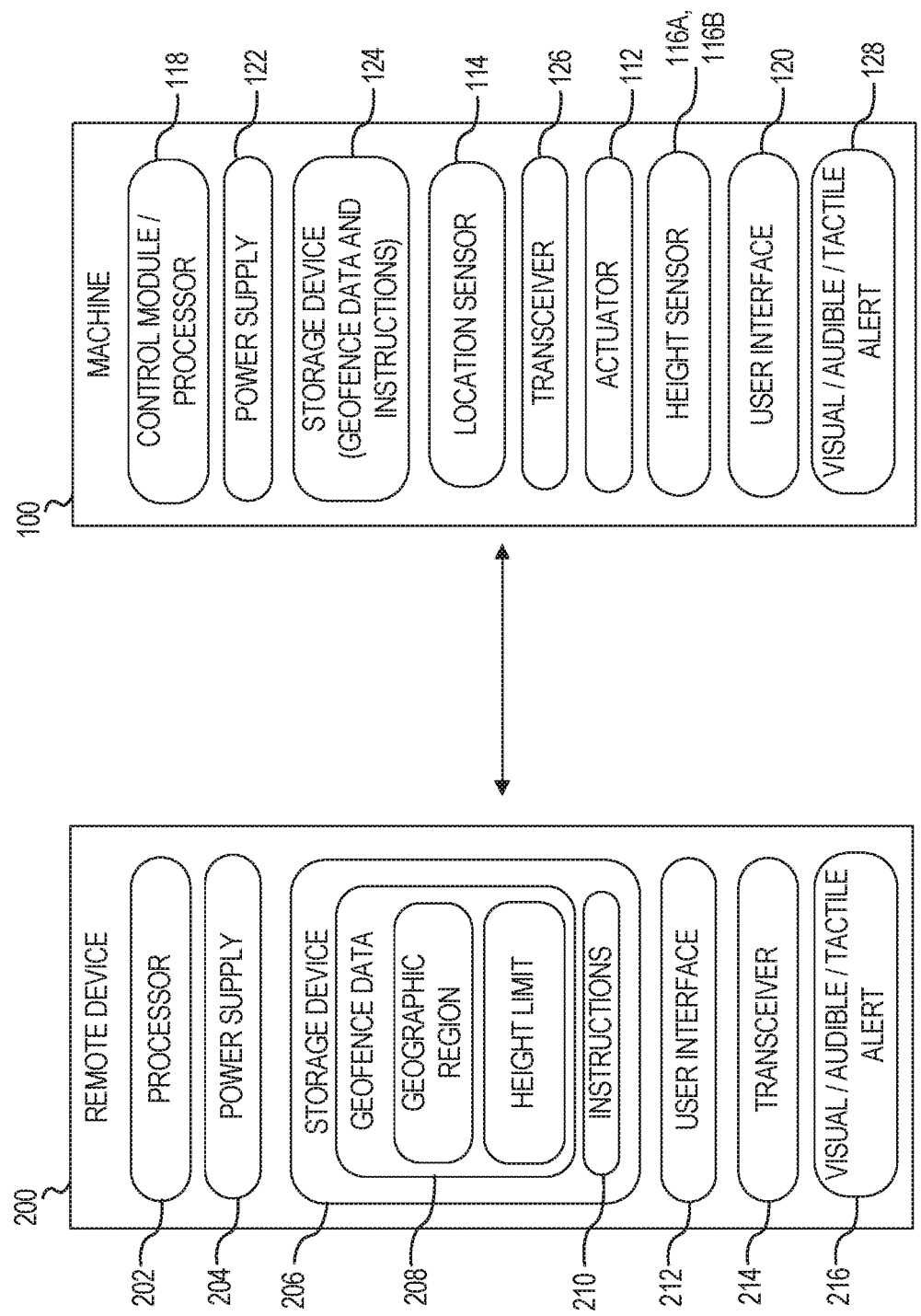
FIG. 4 is a schematic illustration of a machine and a remote device, in accordance with at least one example.

FIG. 4 is a schematic illustration of the machine 100 and the electronic device 200 depicted in FIG. 2. As shown in FIG. 4, the electronic device 200 can include a processor 202, a power supply 204, and a storage device 206 such as a non-transitory computer readable medium configured to store geofence data 208 for providing a geofence. The storage device 206 can also store instructions 210 for operating the electronic device 200 or any portion of the system according to the methods described herein. The electronic device 200 can include a user interface 212 for inputting the geofence data 208, a transceiver 214 for transmitting and/or receiving signals to and from the machine 100 or other devices, and an alert device 216 to alert the user to a possible or known height issue. The alert device 216 can provide any of visual, audible or tactile alerts.

As shown in FIG. 4, the machine 100 can include the processor 118 (e.g., control module), a power supply 122 and a storage device 124. Like the storage device 124 of the electronic device 200, the machine storage device 124 can also include a non-transitory computer readable medium configured to store the geofence data 208 for providing the geofence 300. The storage device 124 can also store instructions for operating the machine 100 according to the methods described herein. In some examples, the processor 118 can include one or more processors in electrical communication with, or disposed within, one or more control modules. In some examples, the processor 118 can include a plurality of processors and or control modules can be in electrical communication with each other, but responsible for different aspects of the machine 100. For example, the geofence data 208 can be received from the electronic device 200 by a first, informational control module. The informational control module can communicate the information received from the electronic device 200 to a chassis control module. In this example, the informational control module may be responsible for communicating with the electronic device 200 and handling more informational aspects of the machine 100, while a chassis control module actually controls the functions of the machine 100.

In some examples, the geofence data 208 can be input into the electronic device 200 by a user and then the geofence data 208 can be transferred to the machine 100. The geofence data 208 can be input into the electronic device 200 by, for example, a user located in an office or out on a work site. To input the geofence data 208, the electronic device 200 can display a map, such as a satellite map or a drone generated map of the work site on the user interface 212, and the user can draw a line around a particular geographic region (e.g., 304A, FIG. 3) and associate a height limit (e.g., 306A, FIG. 1) with the particular geographic region.

The electronic device 200 can transmit the geofence data 208 via the electronic device 200 transceiver 214 as a signal to be received by the machine transceiver 126. The location sensor 114 on the machine 100, along with the geofence data 208 and instructions 210 can be used by the machine processor 118 to control operation of the machine 100. Controlling operation of the machine 100 can include determining that the machine 100 is within a particular geographic region (e.g., 304A, FIG. 3), determining that the machine 100 height exceeds the height limit (e.g., 306A, FIG. 2) of the particular geographic region, and limiting the height of a machine 100 to the defined height limit (e.g., 306A) associated with the particular geographic region. To limit the height of the machine 100, the actuator 112 of the machine 100 can be controlled as directed by the machine processor 118 which can initiate a response to adjust a height of the machine 100 based on height rules associated with the particular geographic region (e.g., 304A, FIG. 3) that the machine 100 is traveling in. This allows the machine to be height-adjusted in view of the overhead obstacle (e.g., 310A, FIGS. 2-3) that the machine 100 is about to travel under or is traveling under.

The location of the machine 100 with respect to the geofence 300 can be determined, for example, by one or more sensors (e.g., location sensors 114) on the machine 100, from one or more of: global position system (GPS), cellular signals, local wireless (e.g., WiFi) signals, Bluetooth, or any other suitable means. In some examples, a sensed location of the transceiver 126 of the machine can be used to determine location. In some examples, a stationary WiFi signal transmitting device can be used in combination with a mobile WiFi signal receiving device as a trigger when a specified WiFi connection is detected and certain rules are satisfied. In other examples, a physical sensor (e.g., laser or photo beam, magnetic sensor, motion sensor, ultrasonic sensor, Bluetooth (e.g., connectivity status) can be used as a trigger for initiating the response. Any suitable means for sensing and determining the location of the machine 100 may be used.

Monitoring to detect whether a machine 100 is within a particular geographic region (e.g., 304A), or has traversed into or out of the particular geographic region can include analyzing data from the location sensor 114 and/or other sources. This can include, for example, the processor 118 analyzing location information received from the location sensor 114. In some examples, the location sensor 114 can be include one or more inertial measurement units (IMU's), or other sensors, that help to define the geographic location of the machine, as well as facilitate determining the height, speed and direction of the machine 100.

The height of the machine 100 can be determined using the height sensor 116A and/or 116B. One example of a height sensor that can be used to measure, estimate or calculate height can include a position-type sensor on the actuator. When an actuator extends, retracts or rotates to move the implement, a position-type sensor on the actuator can be used to estimate or calculate the height of the implement 102 (which can be used to determine the height of the machine 100). Another example of a height sensor can include a sensor that measures pump flow and displacement of a hydraulic actuator. Such as sensor can be used to estimate the displacement of the actuator 112, which can then be used to estimate the height of the implement 102 and therefore also the machine 100.

Yet another sensor that can be used to determine the height of the machine 100 is to use the one or more position sensors 116A, 116B (e.g., or one or more inertial measurement units (IMUs)), as shown in FIG. 1. An IMU (e.g., 116A, 116B) can include accelerometers and other measurement devices that can deduce location, direction, speed, acceleration, loads, implement position relative to the chassis 108 or body 106, as well as other movements of the machine 100. In an example, a first IMU (or first height/position sensor 116A) can be mounted on the chassis 108 or body 106, while a second IMU (or second height/position sensor 116B) can be mounted on the movable implement 102. As the implement 102 is moved, the second IMU (e.g., 116B) is therefore moved in relation to the first IMU (e.g., 116B) which is fixed to the chassis 108 or body 106. The first IMU can generate first IMU data, and the second IMU can generate second IMU data. The processor 118, receiving the first IMU data (or first height/position data) and the second IMU data (or second height/position data), can estimate (e.g., calculate) the height of the machine 100, based on a delta between the first IMU data and the second IMU data (or a delta between the first height/position data and the second height/position data).

Figure 5:
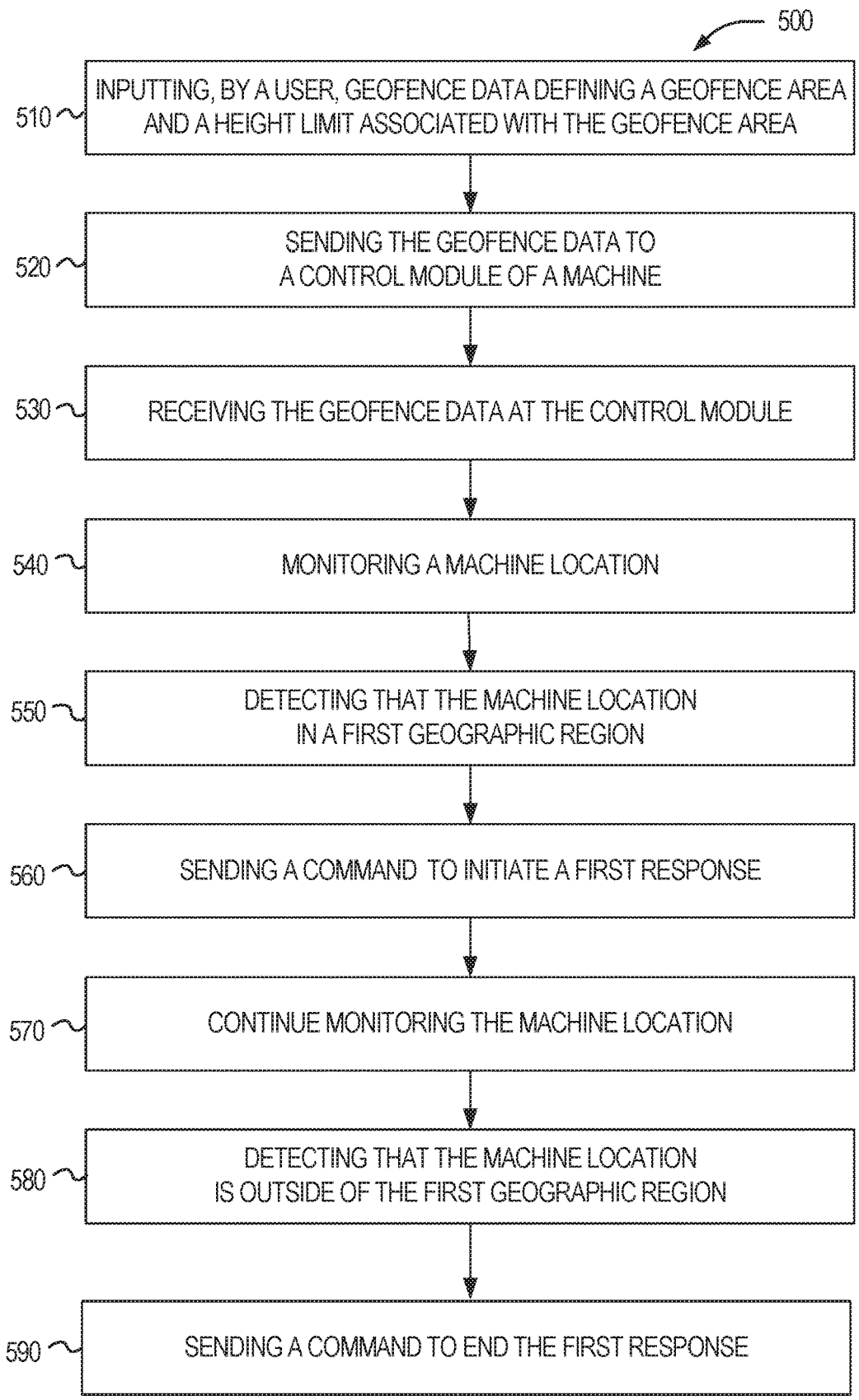
FIG. 5 is a flow chart illustration of a method of operating a machine within an area including a geofence, in accordance with at least one example.

FIG. 5 illustrates a method 500 of controlling the height of an articulated truck (e.g., machine 100) based on geofence data 208 received from an electronic device 200 as described with respect to FIGS. 1-4. In practice, the machine 100, the electronic device 200, and one or more computer readable mediums on which to store instructions for the machine 100 and the electronic device 200, as described herein may be sold, bought, manufactured or otherwise obtained, in part or in whole, in an original equipment manufacturer (OEM) or after-market context.

Example method 500 is merely illustrative and can include step 510 inputting, by a user, geofence data 208 defining a geofence area in a worksite 302. In some examples, the user, using an electronic device 200 such as a tablet, can bring up a satellite map of a worksite 302. Viewing the worksite 302 map, the user can define a geographic region (e.g., 304A) by drawing boundaries on the satellite map. In other examples, the user could enter coordinates, or place standard templates for geofence shapes and rules over an area having a potential issue. Step 510 can also include inputting a height limit (e.g., 306A, FIG. 1) associated with the geographic region (e.g., 304A). The user can repeat step 510 as many times as needed to complete the geofence 300.

Step 520 can include sending the geofence data 208 to the processor/control module 118 of the machine 100. The geofence data 208 can be sent wirelessly from the electronic device 200 to the machine 100. Step 530 can include the processor/control module 118 receiving the geofence data 208. The geofence data 208 can be stored on the storage device 124 of the machine 100. One of the benefits of storing the geofence data 208 on the machine 100 is that even if a network connection between the electronic device 200 and the machine 100 is lost, the machine 100 is still capable of enforcing the geofence 300.

Step 540 can be ongoing and can include monitoring a machine 100 location. In some examples, step 540 can also include monitoring a machine 100 height (e.g., or implement height). Step 550 can include detecting that the machine 100 location is in a first geographic region (304A, FIG. 3). In some examples, step 550 can also include detecting that the machine 100 height exceeds a first height limit (306A, FIG. 3) associated with the first geographic region 304A. Upon determining that the machine 100 is in the first geographic region 304A (e.g., or approaching the first geographic region), step 560 can include sending a command to initiate a first response. The first response can include the processor/control module 118 sending a command to the actuator 112 of the machine 100 to limit the height of the machine. In some examples limiting the height of the machine can include reducing the height of the machine 100 by lowering the implement 102.

Step 570 can include continuing to monitor the machine 100 location, and in some examples, the machine 100 height. Step 580 can include detecting that the machine 100 location is outside of the first geographic region, and step 590 can include ending the first response. In some examples, ending the first response can include one or more of: sending a command to the actuator 112 to end the first response; allowing the user to raise the implement; sending an alert to the user to inform them that the height restriction has been discontinued; and returning the implement 102 to the height the implement was raised to prior to initiating the first response.

As described herein, a storage device may include a machine-readable medium that is non-transitory on which is stored one or more sets of data structures or instructions (e.g., software) embodying or utilized by any one or more of the techniques or functions described herein. The instructions may also reside, completely or at least partially, within a main memory, within a static memory, or within a hardware processor during execution thereof by the machine 100 or electronic device 200. In an example, one or any combination of the hardware processor, the main memory, the static memory, or the storage device may constitute machine readable media.

While the machine-readable medium is illustrated as a single medium, the term "machine-readable medium" may include a single medium or multiple media (e.g., a centralized or distributed database, or associated caches and servers) configured to store the one or more instructions.

The term "computer readable medium" and "machine readable medium" may include any medium that is capable of storing, encoding, or carrying instructions for execution by the machine 100 and that cause the machine 100 or electronic device 200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

Method examples described herein may be machine or computer-implemented at least in part. Some examples may include a computer-readable medium or machine-readable medium encoded with instructions operable to configure an electronic device to perform methods as described in the above examples. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

INDUSTRIAL APPLICABILITY

In general, the foregoing disclosure finds utility in various industrial applications, such as, in preventing collisions of the movable bed of an articulated truck with overhead obstacles in a worksite. The improved method of controlling the height of the articulated truck will now be described with reference to the machine 100, electronic device 200 and geofence 300 of FIGS. 1-4.

Using an electronic device 200, a user working in an office or on a worksite 302 can enter geofence data 208 into an electronic device 200 via a user interface 212. The geofence data 208 can include identifying one or more geographic regions 304A at the worksite 302 where height restrictions on a machine 100 are to be employed. Along with identifying the geographic regions 304A, the user inputs height limits (e.g., restrictions) that are to be associated with each of the geographic regions 304A.

The electronic device 200 transmits the geofence data 208 to a machine 100. As the machine 100 travels through the worksite 302, a control module/processor 118 of the machine 100 monitors a location sensor 114 and a height sensor 116A. Using the geofence data 208 and the location and height information, the machine 100 instructs an actuator 112 to limit or adjust the height of the machine 100 (e.g., by adjusting the height of an implement 102) as necessary to prevent collisions in the one or more geographic regions 304A. The machine 100 can also send an alert to a user interface 120 of the machine 100 and/or limit the travel speed of the machine 100 until the height is adjusted according to the geofence 300.

It will be apparent to those skilled in the art that various modifications and variations can be made. Other embodiments will be apparent to those skilled in the art from consideration of the specification and the practice of the disclosed machine. It is intended that the specification and examples be considered as exemplary only, with a true scope being indicated by the claims and their equivalents.

What is claimed is:

1. A method comprising:
electronically monitoring, using a processor, sensor or transceiver location information to detect a location of a machine; and
responsive to detection, using the processor, that the machine is located within a first geographic region, electronically sending a command, using the processor, to an actuator coupled to the machine to initiate a first response,
wherein the first response includes limiting, using the processor, a height of an implement coupled to a chassis of the machine, wherein the implement is configured to be height-adjusted relative to the chassis by the actuator, wherein the chassis includes a first height sensor and the implement includes a second height sensor and the processor estimates a height of the machine based on a difference between measurements of the first height sensor and the second height sensor.

2. The method of claim 1, wherein limiting the height of the implement includes limiting the height of the implement to a first height, wherein the first height is a maximum height allowed in the first geographic region.

3. The method of claim 2, further comprising:
receiving from a storage device, using the processor, the first height corresponding to the first geographic region.

4. The method of claim 1, wherein responsive to the detection, using the processor, that the machine is within the first geographic region or that the machine is within a second geographic region, sending, using the processor, an implement height alert to a user interface to alert a user to a detected implement height issue.

5. The method of claim 1, wherein the first response includes preventing, using the processor, any movement of the implement by the actuator with respect to the chassis.

6. The method of claim 1, further comprising:
receiving from an off-board application, using the processor, geofence data defining a geofence area,
wherein the geofence data includes the first geographic region and a first height corresponding to the first geographic region, wherein the height of the machine is limited, using the processor and the geofence data, to the first height when the processor detects that the machine is in the first geographic region.

7. A control system for a machine, the system comprising:
an actuator configured to adjust a height of an implement of the machine;
a processor configured to send signals to the actuator, the processor executing instructions to:
receive location information regarding a location of the machine;
determine from the location information if the machine is within a first geographic region; and
responsive to a determination that the machine is within the first geographic region, send a command to the actuator to initiate a first response,
wherein the first response includes limiting the height of an implement of the machine,
wherein the processor is further configured to:
receive geofence data from an off-board application, wherein the geofence data defines a geofence area, wherein the geofence data includes the first geographic region and a first height corresponding to the first geographic region, and wherein the geofence data includes rules which are specific to a particular type of machine; and
to limit the height of the machine, based on the geofence data and the location information, to the first height when the machine is in the first geographic region.

8. The system of claim 7, wherein limiting the height of the implement includes limiting the height of the implement to a first height, wherein the first height is a maximum height allowed in the first geographic region.

9. The system of claim 8, wherein the processor is configured to receive, from a storage device, the first height corresponding to the first geographic region.

10. The system of claim 7, wherein responsive to the determination that the machine is within the first geographic region or responsive to a determination that the machine is within a second geographic region, the processor is configured to send an implement height alert to a user interface to alert a user to a detected implement height issue.

11. The system of claim 7, wherein the first response includes preventing, using the processor, movement of the implement by the actuator with respect to a chassis of the machine that increases the height of the machine.

12. The machine of claim 7, wherein the implement includes at least one of a loader bucket, an excavator boom or a dump bed.

13. A machine comprising:
a chassis;
an implement coupled to the chassis;
an actuator coupled to the chassis and the implement, the actuator configured to adjust a height of the implement relative to the chassis;
a sensor configured to provide machine location information; and
a processor configured to receive the machine location information, to determine if the machine is in a first geographic region, and to send a command to the actuator to initiate a first response if the machine is within the first geographic region,
wherein the first response includes limiting the height of the implement, wherein the implement is configured to be height-adjusted relative to the chassis by the actuator, wherein the chassis includes a first height sensor and the implement includes a second height sensor and the processor estimates a height of the machine based on a difference between measurements of the first height sensor and the second height sensor.

14. The machine of claim 13, wherein limiting the height of the implement includes limiting the height of the implement to a first height, wherein the first height is a maximum height allowed in the first geographic region.

15. The machine of claim 14, wherein the processor is configured to receive, from a storage device, the first height corresponding to the first geographic region.

16. The machine of claim 13, wherein responsive to a determination that the machine is within the first geographic region or responsive to a determination that the machine is within a second geographic region, the processor is configured to send an implement height alert to a user interface disposed on the machine to alert a user to a detected implement height issue.

17. The machine of claim 13, wherein the first response includes preventing, using the processor, movement of the implement by the actuator with respect to the chassis that increases the height of the implement.

18. The machine of claim 13,
wherein the processor is further configured to:
receive geofence data from an off-board application, wherein the geofence data defines a geofence area, wherein the geofence data includes the first geographic region and a first height corresponding to the first geographic region, and
to limit the height of the machine, based on the geofence data and the machine location information, to the first height when the machine is in the first geographic region.

19. The machine of claim 13, wherein the implement includes at least one of a loader bucket, an excavator boom or a dump bed.

* * * * *